United States Patent Office

PTO - BOYERS, PA Duty Station

MISSING PAGE TEMPORARY NOTICE

PATENT # 8969X FOR ISSUE DATE July 17, 1835 HAS BEEN SCANNED, BUT WITH MISSING PAGE(S). UPON RECEIVING OF MISSING PAGE(S), THE ENTIRE DOCUMENT WILL BE RESCANNED. PLEASE CALL THE OFFICE OF DATA BASE ADMINISTRATION AT (703) 308-0555 IF YOU HAVE A QUESTION.

THIS NOTICE IS FOR THE MISSING PAGE CONTAINING:

All Drawings.

Data Conversion Operation

Boyers, Pa

UNITED STATES PATENT OFFICE.

8969X

TIMOTHY MILLER, OF PITTSBURG, PENNSYLVANIA.

IMPROVEMENT IN PLOWS.

Specification forming part of Letters Patent dated October 2 ’, 1829; Reissue dated July 17, 1835.

*To all whom it may concern:*

Be it known that I, TIMOTHY MILLER, of Pittsburg, in the county of Allegheny and State of Pennsylvania, have invented a new and useful Improvement in the Common Agricultural Plow for which Letters Patent were granted on the 23d day of October, in the year 1829, which Letters Patent being hereby canceled on account of a defective specification; and I do hereby declare that the following is a full, clear, and exact description of the construction and operation of the said machine as invented or improved by me.

The object of my improvement being to render the plow more fit to clear itself, I confine myself to the front edge of the mold-board or standard, between the upper part of the share and the beam, as the part to which I adapt my invention, which consists of the following arrangement: This front edge I form into two sharp cutters, each one to present a concaved curved edge from near the point of the share, and said edge will therefore form two curvatures, rising one above the other gradually from near the point of the share to the screw-bolt in that part of the mold-board at the top thereof where it is joined to the beam. The first cutter will rise from near the point of the share in a curve backward to near about half the distance between the said point and the top of the mold-board, where it joins the beam; and it will rise from the share gradually till it presents at its greatest elevation (about half-way between the point and beam) a projecting sharp edge, which is intended to divide the sod first. The second cutter will form its curve backward, and, descending at first from the top of the first cutter, (which is thereby left in a projecting point,) rises again in its curve to the top of the mold-board, near its junction with the beam, and so inclines to the furrow-side that the center of the edge is perpendicular with that side of the beam.

In the operation of my improvement the end for which it is devised is fully answered, for the sod or whatever obstruction is to be cut through, if not fully divided by the first cutter, must be effectually so by the second when it presents its cutter to complete the work of the first, and in this way also the weeds, grass, &c., that would otherwise choke the plow if not carried off by the sod, will immediately fall off on the land side and clear the plow.

What I claim as my invention, and not heretofore known in the above-described machine, is—

The front curved edge of the mold-board or standard between the upper part of the share and the beam, the object of which is to make the plow clear itself.

In testimony that the above is a full, clear, and exact description of the construction and mode of operation of my improvement as invented by me, I have hereunto set my hand this 29th day of April, in the year 1835.

TIMOTHY MILLER.

Witnesses:
ORLANDO MILLER,
ROBT. CRISTT.